United States Patent
Gehlaut et al.

(10) Patent No.: US 12,205,200 B2
(45) Date of Patent: Jan. 21, 2025

(54) CONNECTING PATHS BASED ON PRIMITIVES

(71) Applicant: Adobe Inc., San Jose, CA (US)

(72) Inventors: Tarun Gehlaut, Faridabad (IN); Sasha Makkar, New Delhi (IN); Arshdeep Singh Chugh, New Delhi (IN)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 18/114,755

(22) Filed: Feb. 27, 2023

(65) Prior Publication Data

US 2024/0290015 A1 Aug. 29, 2024

(51) Int. Cl.
*G06T 11/20* (2006.01)

(52) U.S. Cl.
CPC .................... *G06T 11/203* (2013.01)

(58) Field of Classification Search
None
See application file for complete search history.

(56) References Cited

U.S. PATENT DOCUMENTS

| | | | | |
|---|---|---|---|---|
| 7,196,707 | B2 * | 3/2007 | Davignon | G06T 11/203 345/442 |
| 7,609,278 | B1 * | 10/2009 | Dash | G06F 3/0481 345/619 |
| 11,049,296 | B2 * | 6/2021 | Yumer | G06T 11/203 |
| 2016/0078650 | A1 * | 3/2016 | Kishikawa | G06F 16/2228 345/443 |
| 2021/0357113 | A1 * | 11/2021 | Mangu | G06T 9/20 |
| 2021/0390744 | A1 * | 12/2021 | Agrawal | G06T 11/40 |
| 2022/0335669 | A1 * | 10/2022 | Stahlfeld | G06V 10/82 |

OTHER PUBLICATIONS

Baran, Ilya, et al., "Sketching Clothoid Splines Using Shortest Paths", Computer Graphics Forum, vol. 29, No. 2 [retrieved Dec. 19, 2022]. Retrieved from the Internet <http://citeseerx.ist.psu.edu/viewdoc/download?doi=10.1.1.156.3602&rep=rep1&type=pdf>., Jun. 7, 20210, 15 pages.

Bertolazzi, Enrico, et al., "Fast and accurate G1 fitting of clothoid curves", Cornell University arXiv, arXiv.org [retrieved Dec. 19, 2022]. Retrieved from the Internet <https://www.researchgate.net/publication/237062806_Fast_and_accurate_G1_fitting_of_clothoid_curves/link/0046351b1a9d93cf56000000/download>., Jun. 2013, 24 Pages.

Sederberg, Thomas, "Computer Aided Geometric Design", Computer Aided Geometric Design Course Notes [retrieved Dec. 19, 2022]. Retrieved from the Internet <https://scholarsarchive.byu.edu/cgi/viewcontent.cgi?article=1000&context=facpub>., Jan. 10, 2012, 289 Pages.

* cited by examiner

Primary Examiner — Jeffrey J Chow
(74) Attorney, Agent, or Firm — FIG. 1 Patents

(57) ABSTRACT

In implementation of techniques for connecting paths based on primitives, a computing device implements a path connection system to receive a first path and a second path displayed in a user interface. The path connection system determines an end section of the first path and a corresponding end section of the second path. Based on the on the end section of the first path, the path connection system identifies a first primitive. Based on the corresponding end section of the second path, the path connection system identifies a second primitive. The path connection system then generates a connection path for display relative to the first path and the second path in the user interface by generating a Bezier curve based on the first primitive and the second primitive.

20 Claims, 11 Drawing Sheets

CONNECTING PATHS BASED ON PRIMITIVES

BACKGROUND

Paths are connected curves displayed in a user interface. Existing image processing systems use paths to depict curved portions and outlines of an image. For example, an image processing system receives inputs via the user interface of an illustration application specifying several paths to be drawn to represent portions of the image. Each path is defined by parameters and is anchored to a specific location on a drawing canvas in the user interface. To edit the image, a user edits the parameters and locations of the paths. However, techniques used to edit the paths cause errors in some instances, resulting in computational inefficiencies, visual inaccuracies, and increased power consumption.

SUMMARY

Techniques and systems for connecting paths based on primitives are described. In an example, a path connection system receives a first path and a second path displayed in a user interface.

The path connection system determines an end section of the first path and a corresponding end section of the second path. Based on the end section of the first path, the path connection system identifies a first primitive. Based on the corresponding end section of the second path, the path connection system identifies a second primitive. Examples of the first primitive and the second primitive include a line, an arc, a clothoid, and so forth. The first primitive and the second primitive are identified by sampling points of the end section of the first path and the corresponding end section of the second path. In another example, the path connection system optimizes parameter values of the first primitive and the second primitive by modeling a non-linear optimization function to achieve a threshold smoothness level. The path connection system generates a Bezier curve based on the first primitive and the second primitive. Based on the Bezier curve, the path connection system generates a connection path for display relative to the first path and the second path in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
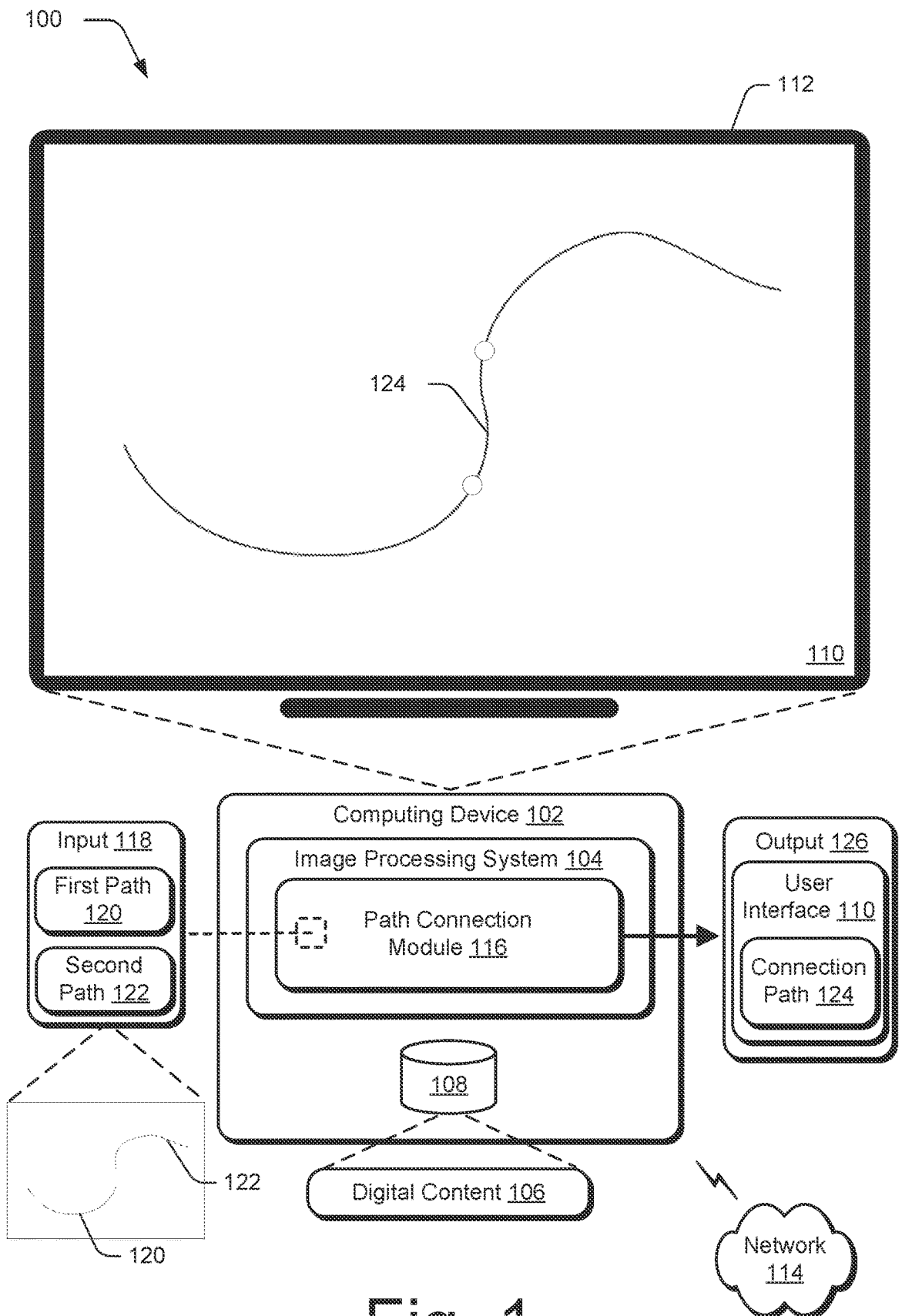
FIG. 1 is an illustration of a digital medium environment in an example implementation that is operable to employ techniques and systems for connecting paths based on primitives as described herein.

Paths are definable using connected collections of vector curves displayed in a user interface and are used by conventional image processing systems to represent curved sections of an image. For example, a user draws a picture in the user interface of an illustration application by drawing several paths to represent portions of an image. Each path is defined by parameters and is anchored to a specific place on a drawing canvas in the user interface. To edit the illustration, the user edits the paths in the user interface, including editing the parameters or locations of the paths. In this example, a user wishes to draw a picture of a dog using an illustration application. The user draws several paths to represent the outline of the dog in the user interface. While doing so, a gap is formed between two particular paths, and the user wishes to fill the gap with a curve so that the two paths appear continuous.

Conventional path connection systems are capable of joining two or more paths together. However, conventional applications use straight lines to connect paths, without regard to the shape or curvature of the paths. Continuing with the previous example, the two curved paths in the user's drawing are connected using a straight line, which is visually inconsistent. Additionally, because the curved paths are connected with a straight line, this forms a sharp angled connection point where the line meets each curved path. This results in a disjointed angular output that is not aesthetically pleasing because a connection point is readily apparent between the paths.

Although conventional applications have been developed to attempt a smoother connection, these conventional applications connect two paths by extrapolating curves from the ends of the paths to connect at an intersection point. However, the intersection point between the extrapolated curves is angled because the curvature of each connecting path is different. This results in an abrupt change of curvature at the angled intersection point between the paths, which is also not aesthetically pleasing.

Techniques and systems for connecting paths using primitives are described that overcome these limitations. In one example, a computing device implements a path connection system to receive a first path and a second path displayed in a user interface. The path connection system also receives a user input instructing the path connection system to connect the first path and the second path. For example, a user draws two separated curved paths in the user interface and then selects the two paths to initiate automatic connection.

The path connection system begins in this example by determining an end section of the first path and a corresponding end section of the second path. This is because the path connection system must first determine which ends of the two paths to connect. For example, the end section of the first path is the final portion of first path created by the user, and the corresponding end section of the second path is the first portion of the second path created by the user. In some examples, this determination is performed by identifying which ends of each path are the closest to each other. The end section of the first path is thus identified for connection to the corresponding end section of the second path.

To solve the problem of abrupt changes in curvature between the paths once the paths are connected, primitives are identified by fitting to the end section of the first path and the corresponding end section of the second path. Examples of primitives include lines, arcs, and clothoids. A colthood is a Euler spiral that translates a straight line on one end of the spiral to a curved line on the other end of the spiral, where curvature is proportional to the distance along the clothoid. The first primitive and the second primitive are used to replace the end section of the first path and the corresponding end section of the second path. This replacement acts to simplify the process of producing smooth curvature at the join point between ends of the paths because primitives with simplified mathematical representation of curvature are easier to connect smoothly than ends with complex representation.

In some examples, the first primitive and the second primitive are identified by sampling points of the end section of the first path and the corresponding end section of the second path. This allows the path connection system to assign primitives to mimic the overall shape of the end section of the first path and the corresponding end section of the second path while still simplifying curvature of the respective end sections. For example, the path connection system identifies an arc primitive for an end section with constant curvature and a clothoid primitive for an end section with varying curvature, based on the sampled points.

To smooth the connection point where the primitives meet, the path connection system models a non-linear optimization function using the sampled points to optimize parameter values of the first primitive and the second primitive. This retains the simplified curvature of the primitives while blending the primitives smoothly with each other and with the remainders of the paths.

At this stage, the first primitive and the second primitive have simplified the end curvature of the first path and the second path. The path connection system then generates a Bezier curve based on geometries of the first primitive and the second primitive to bridge the gap between the first primitive and the second primitive while replacing the primitives. In some examples, the Bezier curve is a connected series of Bezier curves that replace the first primitive and the second primitive to form a connection between the first path and the second path.

Based on the Bezier curve, the path connection system generates a connection path for display relative to the first path and the second path in the user interface. For example, the connection path smoothly connects the first path and the second path in the user's drawing. Because the Bezier curve is based on the first primitive and the second primitive, which have been adjusted for a smooth transition, the resulting connection path fluidly transitions from the curvature of the first primitive, which simplifies the end section of the first path, to the curvature of the second primitive, which simplifies the corresponding end section of the second path. When viewing the complete series of the first path, the connection path, and the second path, it is not evident where one path ends and another path begins.

Connecting paths using primitives in this manner overcomes the disadvantages of conventional path connection techniques that are limited to using straight lines or extrapolated ends of paths to connect paths. For example, the primitives fitted to the end section and the corresponding end section have a simpler curvature, which helps simplify a representation of the curvature of the sections using parameter optimization before applying a Bezier curve to connect two paths, resulting in a smoother connection. Connecting paths using primitives and optimizing the parameters of the primitives also avoids a disjointed angular output that otherwise results from connecting two paths with a straight line as performed in conventional techniques. Additionally, connecting paths using primitives eliminates use of a sharp angled intersection point between the paths that results from connecting two extrapolated paths. This results in a continuous, aesthetic path that is free from angles and abrupt changes in curvature.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for connecting paths based on primitives described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 11.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a path connection module 116 which is illustrated as incorporated by the image processing system 104 to process the digital content 106. In some examples, the path connection module 116 is separate from the image processing system 104 such as in an example in which the path connection module 116 is available via the network 114.

The path connection module 116 is configured to connect paths based on primitives by first receiving an input 118 that includes a first path 120 and a second path 122 displayed in the user interface 110. To determine an order of connection, the path connection module 116 determines an end section of the first path and determines a corresponding end section of the second path. The path connection module 116 then identifies a first primitive based on the end section of the first path by sampling points of the first path 120 and also identifies a second primitive based on the corresponding end section of the second path by sampling points of the second path 122. The first primitive simplifies a curvature of the end section of the first path, and the second primitive simplifies a curvature of the corresponding end section of the second path. Additionally, the first primitive replaces the end section of the first path, and the second primitive replaces the corresponding end section of the second path. Based on the first primitive and the second primitive, the path connection module 116 generates a Bezier curve. The Bezier curve replaces the first primitive and the second primitive to connect the first path 120 and the second path 122.

The path connection module 116 then generates a connection path 124 for display relative to the first path 120 and the second path 122, based on the Bezier curve, as an output 126 in the user interface 110. The connection path 124 is a smooth connection between first path 120 and the second path 122. Because the first primitive simplifies the curvature of the end section of the first path, the transition between the first path 120 and the connection path 124 is smooth. Additionally, because the second primitive simplifies the curvature of the corresponding end section of the second path, the transition between the connection path 124 and the second path 122 is also smooth.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Connecting Paths Based on Primitives

Figure 2:
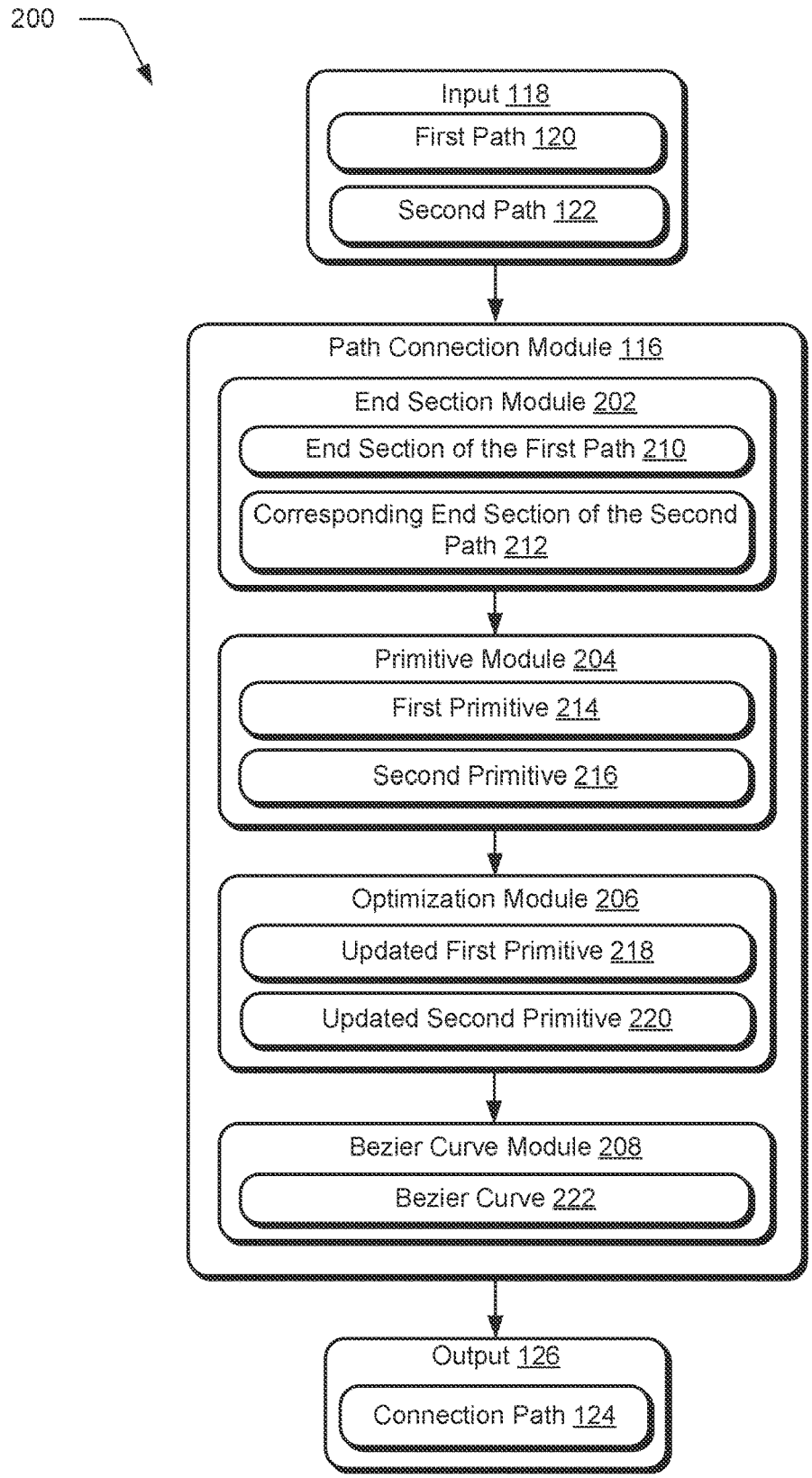
FIG. 2 depicts a system in an example implementation showing operation of path connection module for connecting paths based on primitives.

FIG. 2 depicts a system 200 in an example implementation showing operation of the path connection module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-11.

To begin in this example, the path connection module 116 receives an input 118 including first path 120 and a second path 122 displayed in a user interface 110. The path connection module 116 also includes an end section module 202, a primitive module 204, an optimization module 206, and a Bezier curve module 208.

For instance, the end section module 202 determines an end section of the first path 210 and determines a corresponding end section of the second path 212. In some examples, the end section module 202 also samples points of the first path 120 and the second path 122.

The primitive module 204 then identifies a first primitive 214 based on the end section of the first path 210 and a second primitive 216 based on the corresponding end section of the second path 212. In some examples, the primitive module 204 identifies the first primitive 214 and the second primitive 216 based on points sampled by the end section module 202.

The optimization module 206 then generates an updated first primitive 218 and an updated second primitive 220 by optimizing values of parameters for the first primitive 214 and the second primitive 216. This alters points of the first primitive 218 to smooth a connection between the updated first primitive 218 and a remainder of the first path. This also alters points of the second primitive 220 to smooth a connection between the updated second primitive 220 and a remainder of the second path.

The Bezier curve module 208 then generates a Bezier curve 222 based on the updated first primitive 218 and the updated second primitive 220. The Bezier curve 222 connects the first path 120 to the second path 120 by replacing the updated first primitive 218 and the updated second primitive 220. The Bezier curve module then generates a connection path 124 based on the Bezier curve. The output 126 of the path connection module 116 includes the connection path 124 displayed relative to the first path 120 and the second path 122 in the user interface 110.

FIGS. 3-8 depict stages of connecting paths based on primitives. In some examples, the stages depicted in these figures are performed in a different order than described below.

Figure 3:
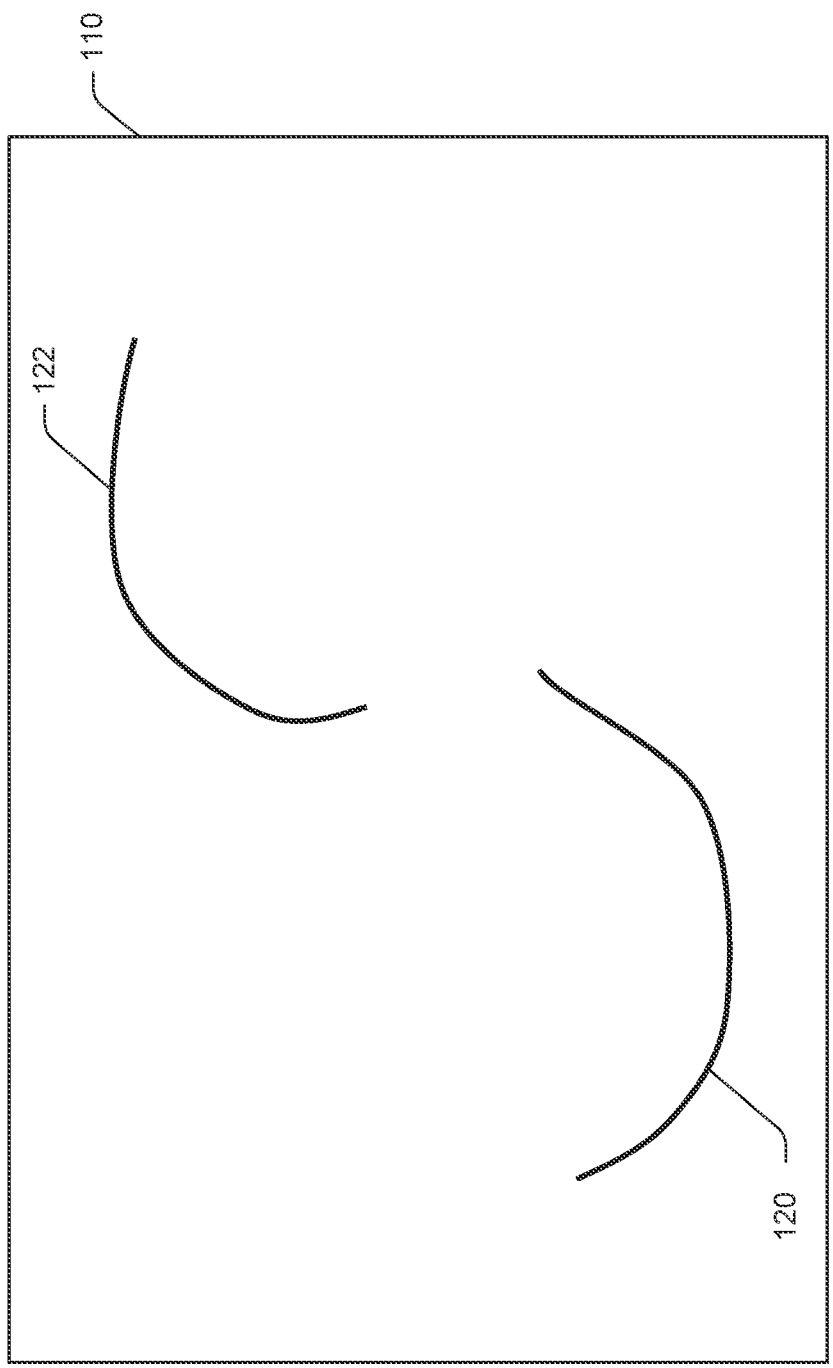
FIG. 3 depicts an example of receiving a first path and a second path.

FIG. 3 depicts an example 300 of receiving a first path 120 and a second path 122. As illustrated, the path connection module 116 receives a first path 120 and a second path 122 displayed in a user interface 110. In some examples, at least one of the first path 120 or the second path 122 is input for display in the user interface 110 by a user. For example, the user draws the first path 120 in the user interface 110 using an illustration application.

In some examples, the path connection module 116 also receives a user input to connect or join the first path 120 and the second path 122. For example, the user selects the first path 120 and the second path 122 in the user interface 110 and clicks a button labeled "Connect Paths" or "Join Paths." In another example, the user draws a connector line between an end of the first path first path 120 and an end of the second path 122 to initiate techniques for connecting paths based on primitives.

In other examples, the path connection module 116 automatically initiates connecting paths based on primitives after receiving a first path 120 and a second path 122 without additional user input.

Figure 4:
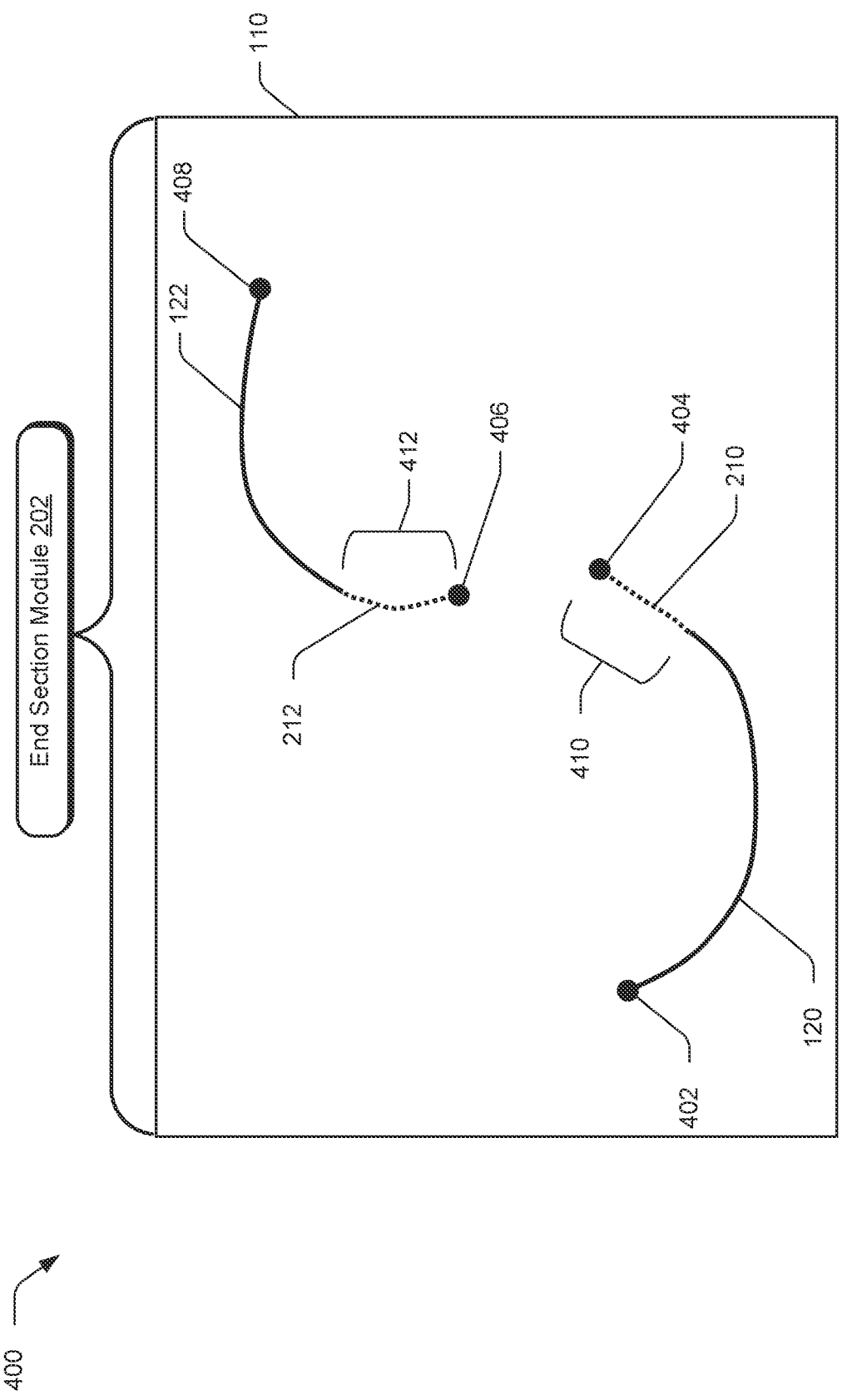
FIG. 4 depicts an example of determining end sections of the first path and the second path.

FIG. 4 depicts an example 400 of determining end sections of the first path 120 and the second path 122. FIG. 4 is a continuation of the example described in FIG. 3. After the path connection module 116 receives the first path 120 and the second path 122 displayed in the user interface 110, the end section module 202 determines an order of connection by determining an end section of the first path 210 and a corresponding end section of the second path 212.

The first path 120 and the second path 122 have end points with associated coordinates. The coordinates are measured in an (x,y) coordinate system or other coordinate system. For example, Point A 402 has coordinates (6,11), Point B 404 has coordinates (31, 12), Point C 406 has coordinates (29, 19), and Point D 408 has coordinates (46, 32). The end section module 202 determines a Euclidean distance between combinations of end points while ignoring the distance between end points of the same path. A Euclidean distance is a length of a line between two points. An equation for Euclidean distance, d, is:

$$d = \sqrt{((x_2 - x_1)^2 + (y_2 - y_1)^2)}$$

In this example, the end section module 202 ignores the distance between Point A 402 and Point B 404 because both are end points of the first path 120. The end section module 202 also ignores the distance between Point C 406 and Point D 408 because both are end points of the second path 122. The Euclidean distance between the Point A 402 and the Point C 406 is 24.3516. The Euclidean distance between Point A 402 and Point D 408 is 45.1174. The Euclidean distance between the Point B 404 and the Point C 406 is 7.2801. The Euclidean distance between the Point B 404 and the Point D 408 is 25. Because the Euclidean distance between the Point B 404 and the Point C is the shortest, these points are selected to connect. In some examples, a user manually selects which points to connect.

Some examples include more than two paths to connect. For example, the user interface 110 includes n paths. Paths with the shortest distance are connected first. After the first connection operation is completed, the end section module 202 selects additional end sections, re-using calculations for previous unselected paths, until one path is left.

In this example, the end of the first path 120 associated with the Point B 404 is the end section of the first path 210 and the end of the second path 122 associated with the Point C 406 is the corresponding end section of the second path 212.

In other examples, the end section module 202 determines the end section of the first path 210 and the corresponding end section of the second path 212 based on an order of input for display in the user interface 110. Using the above example, a user first draws the first path 120 using an illustration application for display in the user interface 110 by drawing from Point A 402 to Point B 404. The user then draws the second path 122 by drawing from Point C 406 to Point D 408. The end section module 202 establishes a path direction based on the order of input. For example, the end section of the first path 210 is the final portion of first path created by the user, and the corresponding end section of the second path 212 is the first portion of the second path created by the user. Because the first path 120 was drawn from Point A 402 to Point B 404, Point B 404 defines the end section of the first path 210. Because second path 122 was drawn from Point C 406 to Point D 408, Point C 406 defines the corresponding end section of the second path 212.

The end section module 202 also samples points from the end section of the first path 210 and the corresponding end section of the second path 212 for use by the primitive module 204. For example, the end section module 202 generates first path sampled points 410 and second path sampled points 412.

In some examples, the end section module 202 samples points based on a cubic Bezier. An equation for a cubic Bezier, where $0 \leq t \leq 1$, is:

$$B(t) = (1-t)^3 P_0 + 3(1-t)^2 t P_1 + 3(1-t)t^2 P_2 + t^3 P_3$$

To sample points based on the equation for the cubic Bezier, t is varied from 0 to 1. For example, the interval (0, 1] is split into k points to receive different values of t as [1/k, 2/k, ..., (k−1)/k, 1]. These different t values are input to the cubic Bezier equation to obtain different values of (x,y), which are sampled points. The end section module 202 samples points from the end section of the first path 210 and the corresponding end section of the second path 212 to generate the first path sampled points 410 and the second path sampled points 412.

Figure 5:
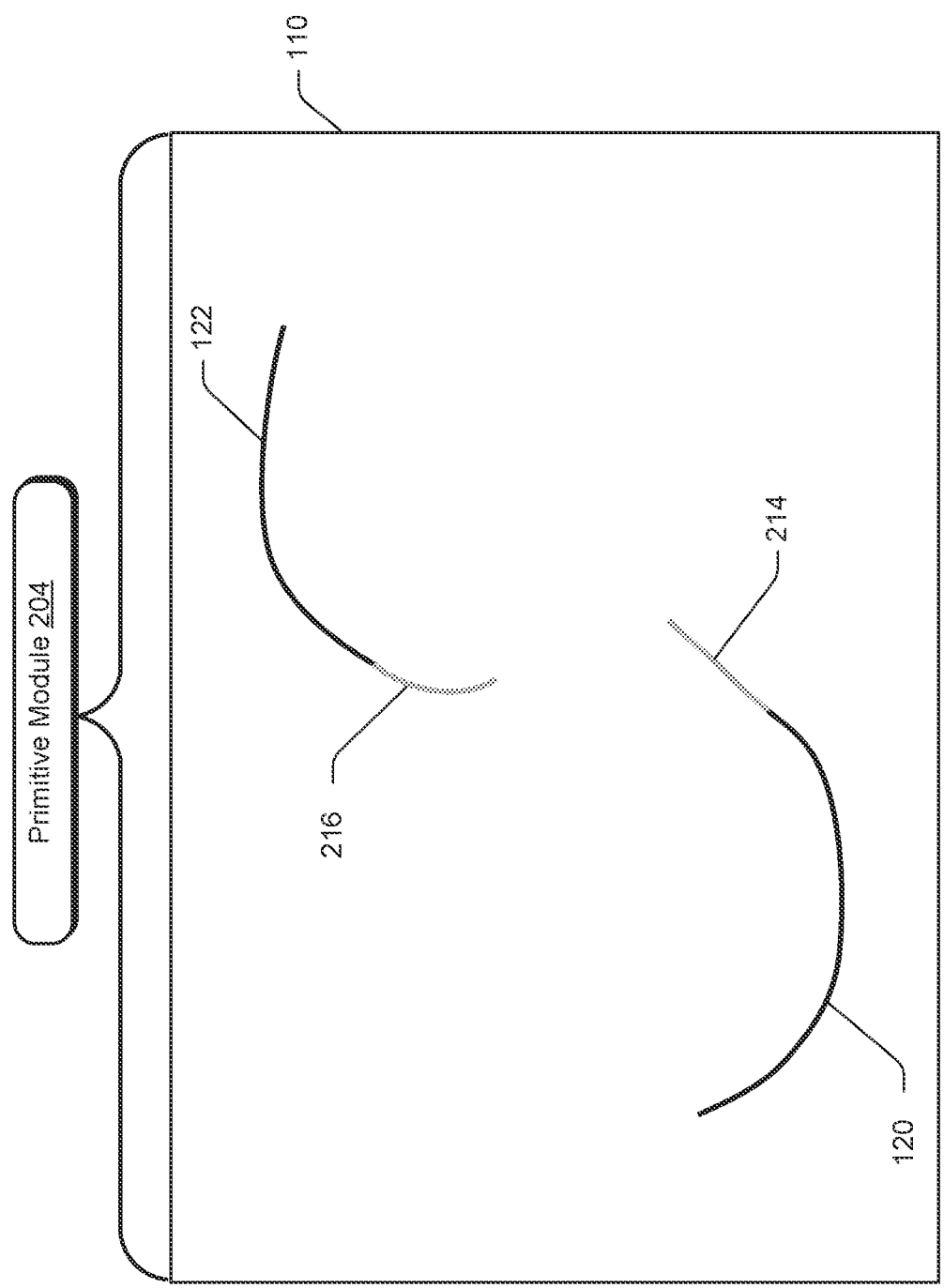
FIG. 5 depicts an example of identifying a first primitive and a second primitive.

FIG. 5 depicts an example 500 of identifying a first primitive 214 and a second primitive 216. FIG. 5 is a continuation of the example described in FIG. 4. After the end section module 202 determines an order of connection to be performed by determining an end section of the first path 210 and a corresponding end section of the second path 212 and generates the first path sampled points 410 and the second path sampled points 412, the primitive module 204 identifies the first primitive 214 and the second primitive 216.

Primitives include, but are not limited to, lines, arcs, and clothoids. Primitives are identified for the end section of the first path 210 and the corresponding end section of the second path 212 and are altered using parameter optimization to simplify a geometry of the ends before a Bezier curve is generated.

Lines are defined by a starting point, a starting direction, and a length. K points, collected from the first path sampled points 410 and the second path sampled points 412 using the cubic Bezier equation, where $p_0, \ldots, p_{k-1}$, are used to find a best-fit line section. The best-fit line section minimizes this error function for the line:

$$\sum_{i=0}^{k-1} d_c(p_i)^2$$

where $d_c(p_i)$ is a distance of a sampled point $p_i$ from the curve.

The primitive module 204 identifies a line that minimizes the error function and passes through the mean:

$$\bar{p} = \left(\sum_{i=0}^{k-1} p_i\right)/k$$

The direction of the line is the eigenvector of:

$$\sum_{i=0}^{k-1} (p_i - \bar{p})(p_i - \bar{p})^T$$

The primitive module 204 identifies the line based on the projected end points $p_0$ and $p_{k-1}$. In other examples, the primitive module 204 fits a line segment using other methods.

Arcs are defined by a starting point, a starting direction, a length, and a curvature. The error function for the line also applies to the arc:

$$\sum_{i=0}^{k-1} d_c(p_i)^2$$

In the error function, $d_c(p_i)$ is a distance of a sampled point $p_i$ from the arc. The arc is fitted by transforming points $p_i=(x_i$ and $y_i)$ onto a paraboloid $$(x_i, y_i) \rightarrow (x_i, y_i, x_i^2 + y_i^2) = p_i'$$

This transforms circles represented in 2D to ellipses represented in 3D. A plane of the ellipse determines the original circle. The plane passes though the mean:

$$\overline{p'} = \left(\sum_{i=0}^{k-1} p_i'\right)/k$$

The plane is normal to the eigenvector:

$$\sum_{i=0}^{k-1}(p_i' - \overline{p'})(p_i' - \overline{p'})^T$$

The primitive module 204 identifies the arc based on a projected intersection of the plane and the paraboloid in the (x,y) plane.

Clothoids are defined by a starting point, a starting direction, a length, a start curvature, and an end curvature. The following equations define elements of a clothoid:

$x'(s)=\cos\theta(s), x(0)=x_0$ $y'(s)=\sin\theta(s), y(0)=y_0$ $\theta'(s)=K(s), \theta(0)=\theta_0$ In the above equations, s is the arc parameter (length) of the curve, $\theta(s)$ is the direction of tangent (x' (s), y' (s)) and K(s) is the curvature at point (x(s), y(s)). The curvature of a clothoid changes linearly with length. Hence, $K(s)=\kappa's+\kappa$. When $\kappa'=0$, the curve has a consistent curvature and represents a circle.

The general parametric form of a clothoid is:

$$x(s) = x_0 + \int_0^s \cos\left(\frac{1}{2}\kappa'\tau^2 + \kappa\tau + \theta_0\right)d\tau$$

$$y(s) = y_0 + \int_0^s \sin\left(\frac{1}{2}\kappa'\tau^2 + \kappa\tau + \theta_0\right)d\tau$$

In this example, $$\frac{1}{2}\kappa'\tau^2 + \kappa\tau + \theta_0$$

and $\kappa's+\kappa$ represent the angle and curvature at s. The Gauss-Newton algorithm is used to optimize the error function over the clothoid parameters. The error function for the line and the arc also applies to the clothoid:

$$\sum_{i=0}^{k-1} d_c(p_i)^2$$

In the error function, $d_c(p_i)$ is a distance of a sampled point $p_i$ from the clothoid.

In some examples, the primitive module 204 includes some of the initial points from the first path 120 when fitting the first primitive 214 and includes some of the end points from the second path 122 when fitting the second primitive 216, which helps match the geometry a primitive to the geometry of a respective path. A more accurate primitive fitting results from including more points.

In this example, the primitive module 204 identifies a line as the first primitive 214 based on the first path sampled points 410. The primitive module 204 identifies an arc as the second primitive 216 based on the second path sampled points 412. The first primitive 214 replaces the end section of the first path 210 and includes some of the first path sampled points 410. The second primitive 216 replaces the corresponding end section of the second path 212 and includes some of the second path sampled points 412.

In other examples, a series of multiple connected primitives is fitted to the end section. For example, to fit a primitive to an end section with varying slope or curvature, the end section is broken into individual curves representing different curvatures, and individual primitives are fitted to the different curvatures.

Figure 6:
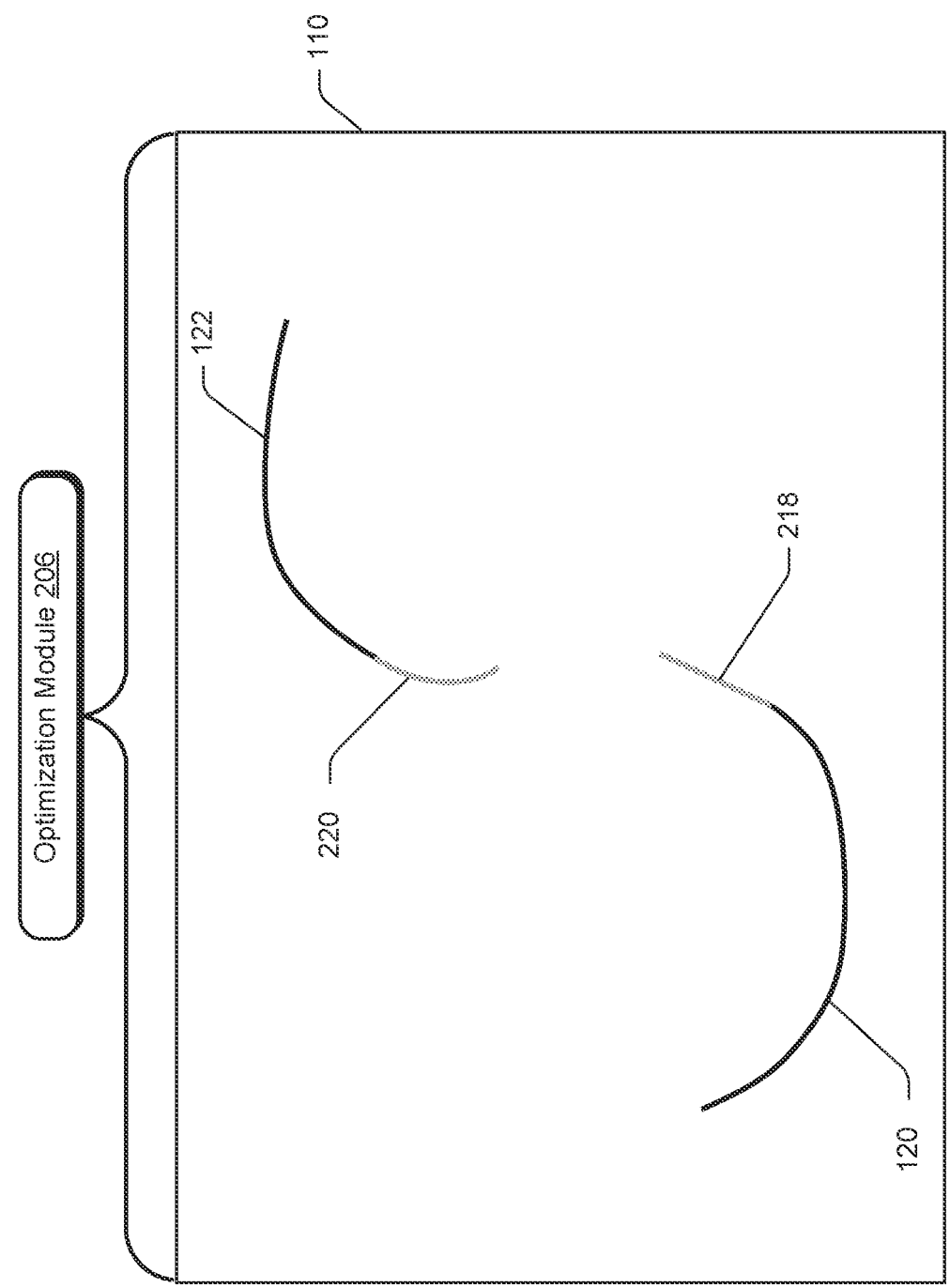
FIG. 6 depicts an example of generating an updated first primitive and an updated second primitive.

FIG. 6 depicts an example 600 of generating an updated first primitive 218 and an updated second primitive 220. FIG. 6 is a continuation of the example described in FIG. 5. After the primitive module 204 identifies the first primitive 214 and the second primitive 216, the optimization module 206 generates an updated first primitive 218 and an updated second primitive 220.

The updated first primitive 218 and the updated second primitive 220 are generated by optimizing the values of the first primitive 214 and the second primitive 216 to achieve a threshold level of continuity, such as a desired degree of smoothness specified by the user. For example, connection smoothness is measured on a scale from G0 continuity, being a low level of smoothness that is characterized by sharp connection edges, to G2 continuity, being a high level of smoothness. G1 continuity is a medium level of smoothness. The optimization module 206 performs non-linear optimization based on a specified level of smoothness. For example, a user specifies G2 continuity for connecting the first path 120 and the second path 122.

The optimization module 206 generates an updated first primitive 218 and an updated second primitive 220 by updating parameters for the primitives, which are defined by a startX, a startY, a startTangent, a startCurvature, and a dCurvature.

To begin optimization, the optimization module 206 reverses a direction of the first primitive 214, changing the startX, the startY, the startTangent, the startCurvature, and the dCurvature for the first primitive 214.

To achieve G0 continuity for a primitive, the optimization module 206 creates initial values for X and Y. To do this, the optimization module 206 locates a midpoint between a start point of the first primitive 214 that is reversed and a start point of the second primitive 216. The optimization module 206 then sets the X and Y initial values from the appropriate coordinate of the mid-point. This results in G0 continuity because the primitives use matching values for X and Y.

To achieve G1 continuity, the optimization module 206 creates a single variable startTangent. The optimization module 206 sets the initial value of the variable startTangent to the average of the startTangent of the first primitive 214 and the startTangent of the second primitive 216. When evaluating startTangent for the first primitive 214, π is added to the variable. This results in G1 continuity.

To achieve G2 continuity, the optimization module 206 creates a single variable startCurvature. The optimization module 206 sets the initial value of startCurvature to the average of the startCurvature of first primitive 214 and startCurvature of the second primitive 216. When evaluating startCurvature for the first primitive 214, startCurvature is multiplied by −1 is because the first primitive 214 has been reversed.

In some examples, the optimization module 206 creates separate variables for the length of both the first primitive 214 and the second primitive 216, which are initialized to the original length of the first primitive 214 and the second primitive 216.

In some examples, the optimization module 206 also creates separate variables for the endCurvature for both primitives. This is to match an end curvature of the result of the optimization module 206 with the original curvature at the start of the first primitive 214, which is no longer reversed. The endCurvature of the first primitive 214 and the end Curvature of the second primitive 216 are constant.

The optimization module 206 adds additional constraints to the length variables. For example, the length of the first primitive 214 or the second primitive 216 is less than 3 times the distance between the selected end points of the original primitives. The length of the first primitive 214 or the second primitive 216 is greater than 0.5 times its original length.

Once the initial values are set, using a Newton-Raphson technique, the optimization module 206 minimizes the function below:

Total error = $w1 *$ (weighted *LSE* of the sampled points from corresponding primitives) + $w2 *$ (difference in end Curvature of primitives) + $w3 *$ (difference in end Angle)

In this example, w1, w2, w3 are parameters that are adapted based on different presets or user preferences. The optimization module 206 then uses the value of the variables corresponding to the minimum error to update the parameters the first primitive 214 and the second primitive 216. The first primitive 214 is then flipped back to its original direction. This results in an updated first primitive 218 and an updated second primitive 220.

In this example, the optimization module 206 generates an updated first primitive 218 based on the first primitive 214 and an updated second primitive 220 based on the second primitive 216 by performing non-linear optimization.

Figure 7:
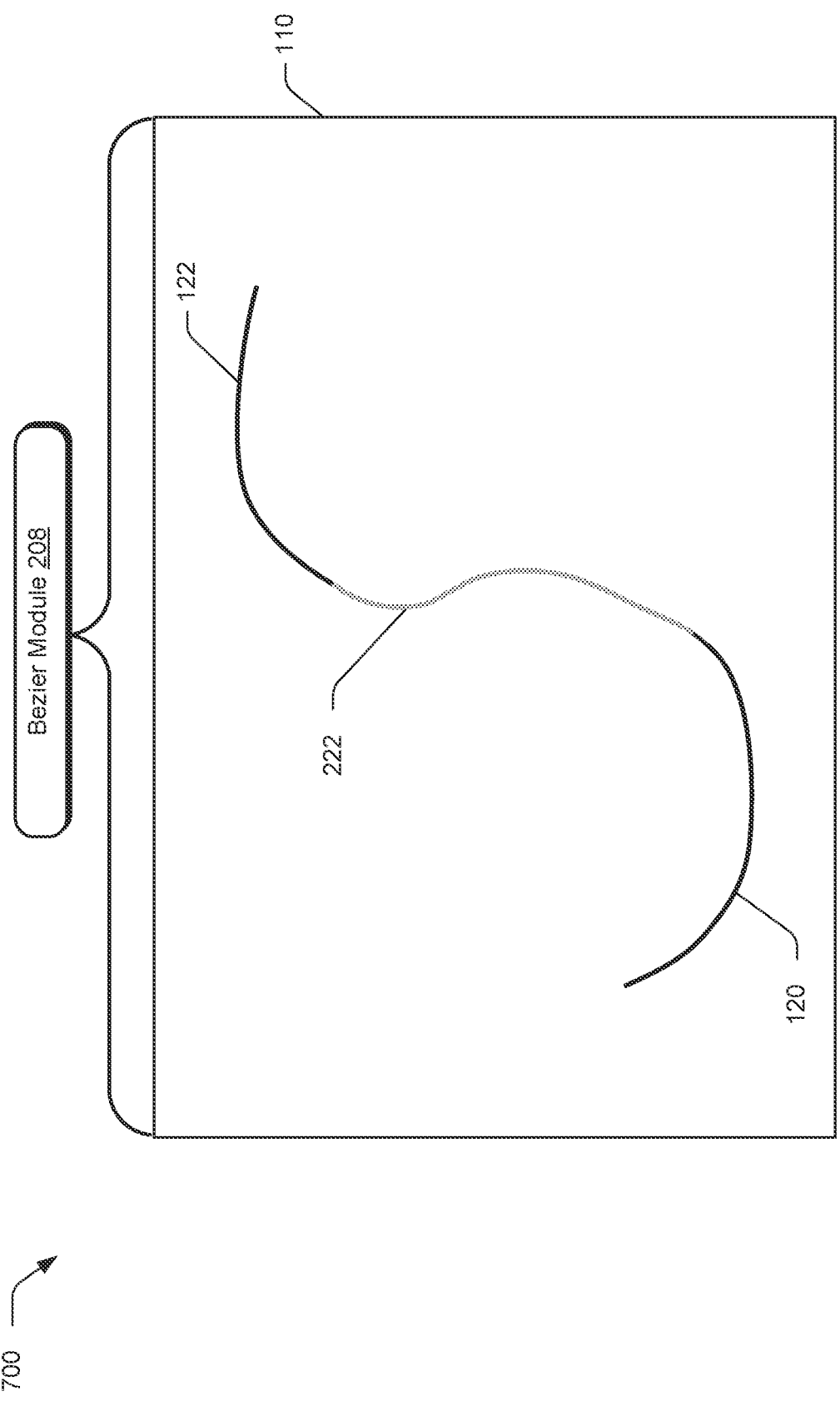
FIG. 7 depicts an example of generating a Bezier curve.

FIG. 7 depicts an example 700 of generating a Bezier curve 222. FIG. 7 is a continuation of the example described in FIG. 6. After the optimization module 206 generates an updated first primitive 218 and an updated second primitive 220, the Bezier curve module 208 generates a Bezier curve 222 to connect the first path 120 and the second path 122.

The Bezier curve module 208 converts the updated first primitive 218 and the updated second primitive 220 into a Bezier curve 222 or a set of Bezier curves. This includes converting lines, arcs, and clothoids to Bezier curves.

To convert a clothoid to a cubic Bezier, the Bezier curve module 208 uses Hermite interpolation coupled with minor optimization to determine a number of Beziers to represent the clothoid. A Hermite curve is represented by four control points: Start Point ($x_0$, $y_0$), End Point ($x_s$, $y_s$), Start Derivative $d_0$, and End Derivative $d_s$. The Bezier curve module 208 performs the following transformation using the four control points:

$$x_0 + \frac{1}{3}(x_1 - x_0), y_0 + \frac{1}{3}d_0(x_1 - x_0)$$

$$x_1 + \frac{1}{3}(x_1 - x_0), y_1 + \frac{1}{3}d_1(x_1 - x_0)$$

The Bezier curve module 208 breaks the clothoid into a set of cubic Beziers, which approximates the curves of the clothoid. For j=1 . . . n, each clothoid is converted into a set of j cubic Beziers, where the length of each cubic Bezier is fixed at s/j (s being clothoid length). To determine if the set of cubic Beziers fit the original clothoid, the Bezier curve module 208 samples p points from each cubic Bezier, and a corresponding squared error from the clothoid is calculated. If the total sum of the squared error is within a designated tolerance, the loop breaks, resulting in the set of cubic Beziers.

In this example, the Bezier curve 222 generated by the Bezier curve module 208 includes a set of different Bezier curves that are connected. In other examples, the Bezier curve module 208 generates a Bezier curve 222 that is a single curve.

Additionally or alternatively, the Bezier curve 222 replaces a portion of the first path 120, a portion of the second path 122, or portions of both the first path 120 and the second path 122.

In some examples, connection points of the Bezier curve 222 are adjusted to reduce a connection angle between the Bezier curve 222 and the first path 120 and to reduce a connection angle between the Bezier curve 222 and the second path 122.

Figure 8:
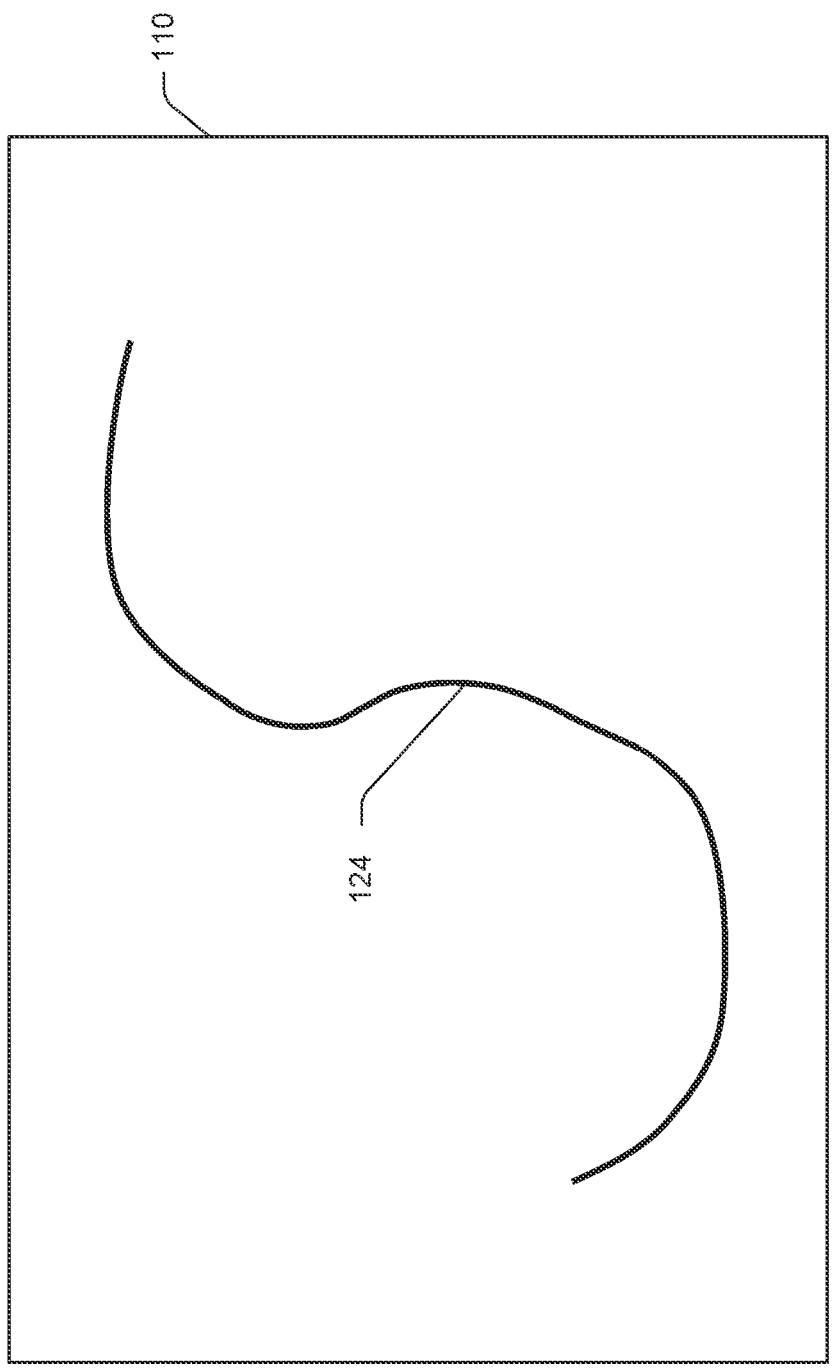
FIG. 8 depicts an example of generating a connection path.

FIG. 8 depicts an example 800 of generating a connection path 124. FIG. 8 is a continuation of the example described in FIG. 7. After the Bezier curve module 208 generates a Bezier curve 222, the path connection module 116 generates a connection path 124 based on the Bezier curve 222 for display relative to the first path 120 and the second path 122 in the user interface 110.

To generate the connection path 124, the path connection module 116 removes the end section of the first path 210 and the corresponding end section of the second path 212. The path connection module 116 replaces the end section of the first path 210 and the corresponding end section of the second path 212 with the Bezier curve 222.

In some examples, the path connection module 116 performs additional optimization to increase smoothness of the connection path 124. The path connection module 116 adjusts connection points of the connection path 124 to reduce a connection angle between the connection path 124 and a remainder of the first path and to reduce a connection angle between the connection path 124 and a remainder of the second path. The path connection module 116 performs this by averaging the connection angle between the connection path 124 and the remainder of the first path with the connection angle between the connection path 124 and the remainder of the second path.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 9:
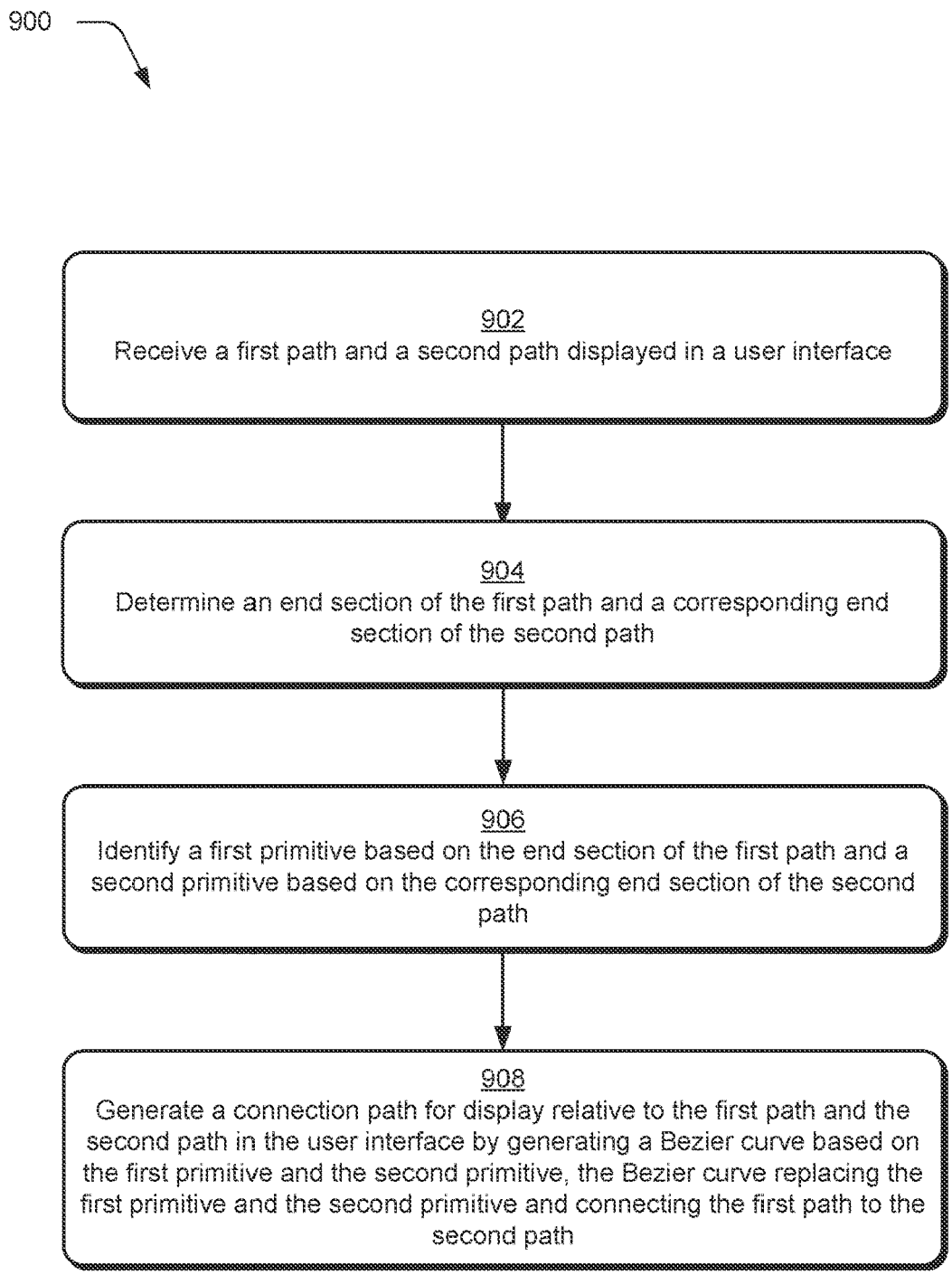
FIG. 9 depicts a procedure in an example implementation of connecting paths based on primitives.

FIG. 9 depicts a procedure 900 in an example implementation of connecting paths based on primitives. At block 902, a first path 120 and a second path 122 displayed in a user interface 110 are received.

At block 904, an end section of the first path 210 and a corresponding end section of the second path 212 are determined. In some examples, determining the end section of the first path 210 and the corresponding end section of the second path 212 includes identifying a shortest Euclidean distance between two endpoints of the first path 120 and the second path 122. Additionally or alternatively, determining the end section of the first path 210 and the corresponding end section of the second path 212 is based on a user input.

At block 906, a first primitive 214 is identified based on the end section of the first path 210 and a second primitive 216 is identified based on the corresponding end section of the second path 212. In some examples, the first primitive 214 is identified by sampling points of the end section of the first path 210, and the second primitive 216 is identified by sampling points of the corresponding end section of the second path 212. In some examples, the first primitive 214 and the second primitive 216 include a line, an arc, or a clothoid. Additionally or alternatively, the first primitive 214 includes points from the end section of the first path 210, and the second primitive includes points from the corresponding end section of the second path 212. In some examples, the first primitive 214 replaces the end section of the first path 210 and the second primitive 216 replaces the corresponding end section of the second path 212.

Figure 10:
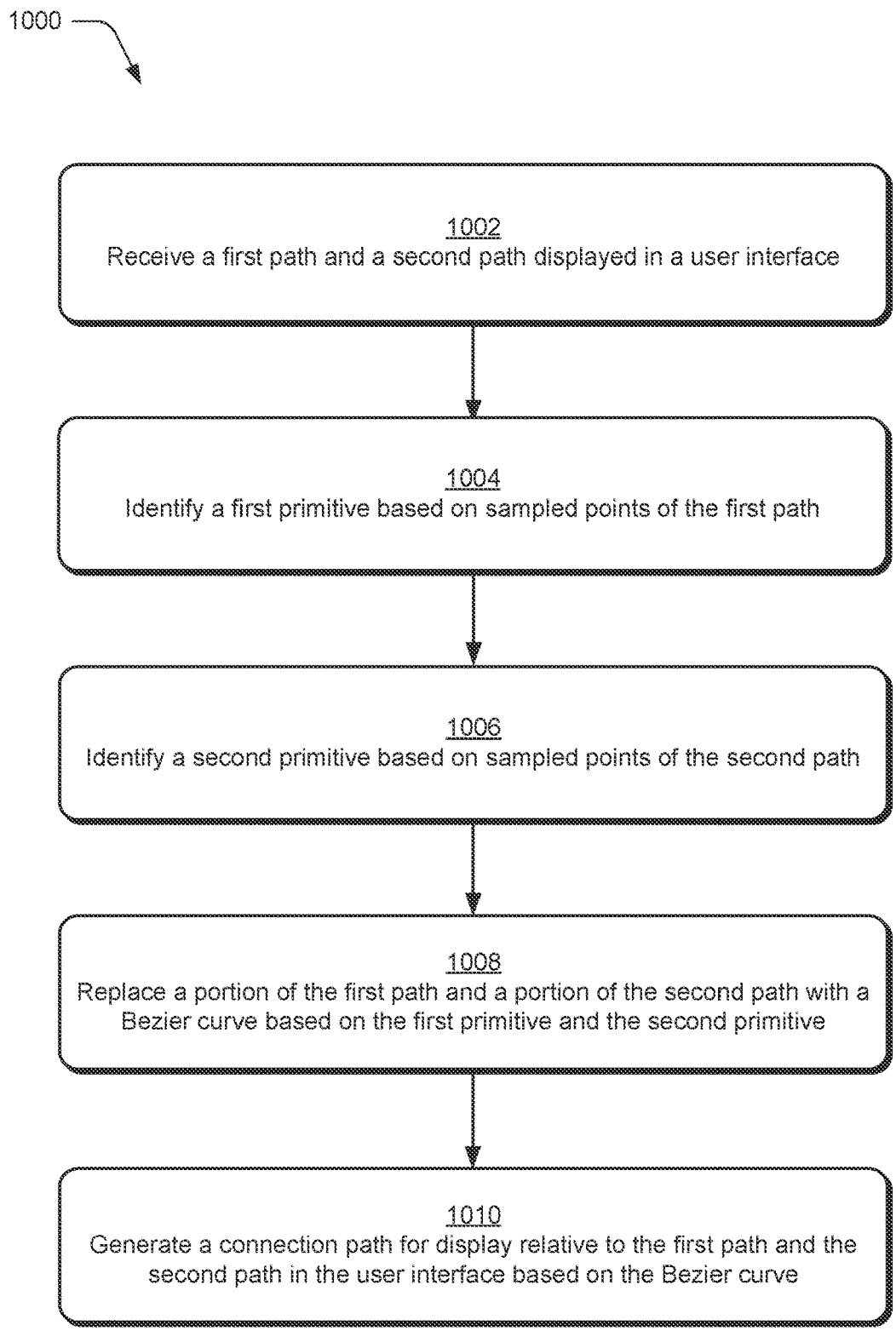
FIG. 10 depicts a procedure in an additional example implementation of connecting paths based on primitives.

At block 908, a connection path 124 is generated for display relative to the first path 120 and the second path 122 in the user interface 110 by generating a Bezier curve 222 based on the first primitive 214 and the second primitive 216 the Bezier curve 222 replacing the first primitive 214 and the second primitive 216 and connecting the first path 120 to the second path 122. In some examples, generating the connection path 124 further comprises optimizing parameter values of the first primitive 214 and the second primitive 216 by modeling a non-linear optimization function to achieve a threshold smoothness level. Some examples include adjusting connection points of the Bezier curve 222 to reduce a connection angle between the Bezier curve 222 and the first path 120 and reducing the connection angle between the Bezier curve 222 and the second path 122. FIG. 10 depicts a procedure 1000 in an additional example implementation of connecting paths based on primitives. At block 1002, a first path 120 and a second path 122 displayed in a user interface 110 are received.

At block 1004, a first primitive 214 is identified based on sampled points of the first path 120. In some examples, the sampled points of the first path 120 are identified by determining an end section of the first path 210.

At block 1006, a second primitive 216 is identified based on sampled points of the second path 122. In some examples, the sampled points of the second path 122 are identified by determining a corresponding end section of the second path 212. Additionally or alternatively, determining the end section of the first path 210 and the corresponding end section of the second path 212 includes identifying a shortest Euclidean distance between two endpoints of the first path 120 and the second path 122.

At block 1008, a portion of the first path 120 and a portion of the second path 122 are replaced with a Bezier curve 222 based on the first primitive 214 and the second primitive 216. In some examples, the first primitive 214 and the second primitive 216 include a line, an arc, or a clothoid.

At block 1010, a connection path 124 is generated for display relative to the first path 120 and the second path 122 in the user interface 110 based on the Bezier curve 222. In some examples, generating the connection path 124 further comprises optimizing parameter values of the first primitive 214 and the second primitive 216 by modeling a non-linear optimization function. Additionally or alternatively, the Bezier curve 222 is formed by joining different Bezier curves. Some examples include adjusting connection points of the Bezier curve 222 to reduce a connection angle between the Bezier curve 222 and the first path 120 and reducing the connection angle between the Bezier curve 222 and the second path 122.

Example System and Device

Figure 11:
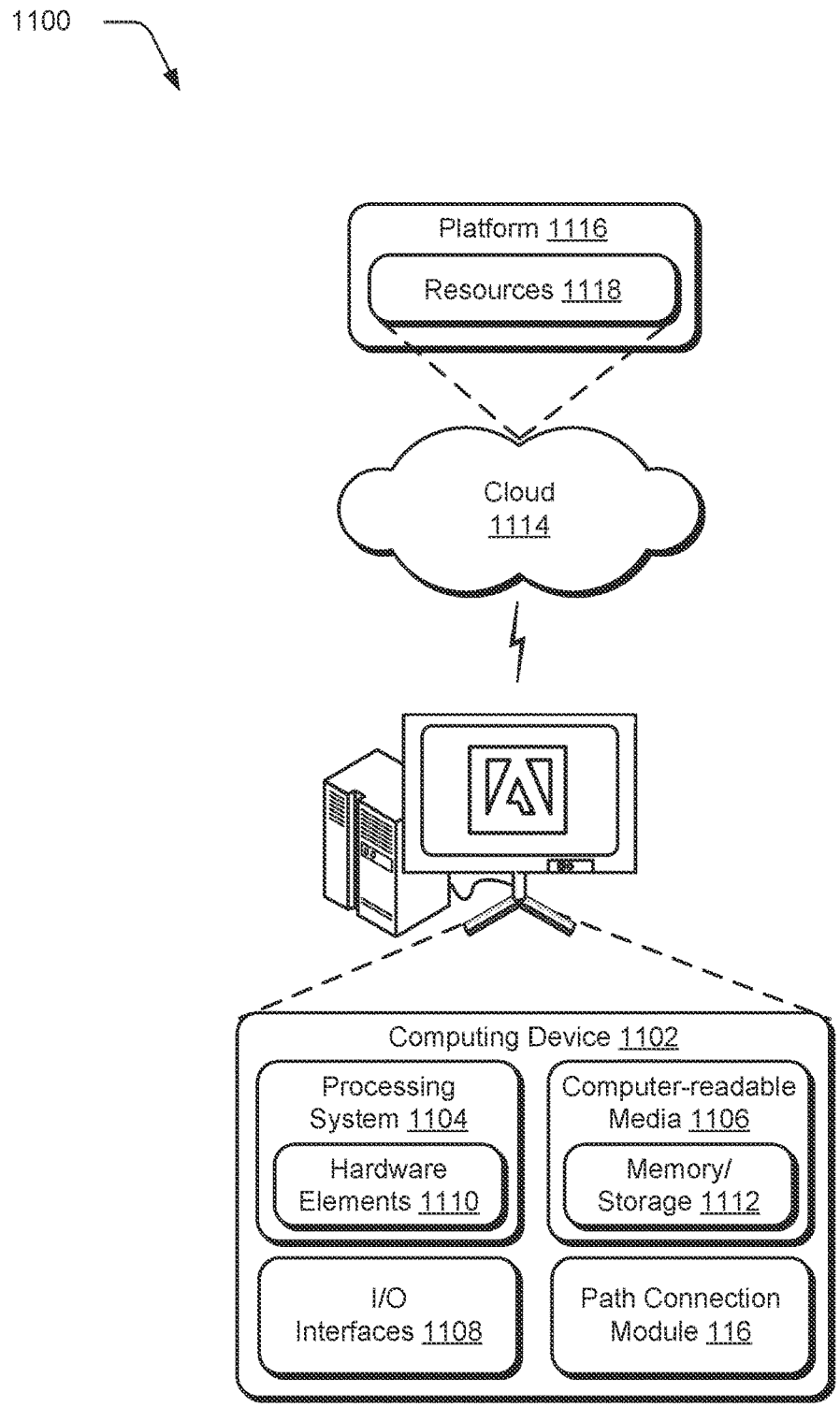
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the path connection module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices and/or processing systems 1104) to implement techniques, modules, and examples described herein.

The techniques described herein are supported by various configurations of the computing device 1102 and are not limited to the specific examples of the techniques described herein. This functionality is also implementable through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method comprising:
receiving, by a processing device, a first path and a second path displayed in a user interface;
determining, by the processing device, an end section of the first path and a corresponding end section of the second path;
identifying, by the processing device, a first primitive based on a curvature of the end section of the first path and a second primitive based on a curvature of the corresponding end section of the second path; and
generating, by the processing device, a connection path for display relative to the first path and the second path in the user interface by converting the first primitive and the second primitive into a Bezier curve that is a continuous path, the Bezier curve replacing the end section of the first path and the end section of the second path and connecting the first path to the second path.

2. The method of claim 1, wherein determining the end section of the first path and the corresponding end section of the second path includes identifying a shortest Euclidean distance between two endpoints of the first path and the second path.

3. The method of claim 1, wherein determining the end section of the first path and the corresponding end section of the second path is based on a user input.

4. The method of claim 1, wherein the first primitive is identified by sampling points of the end section of the first path and the second primitive is identified by sampling points of the corresponding end section of the second path.

5. The method of claim 4, wherein the first primitive includes points from the end section of the first path and the second primitive includes points from the corresponding end section of the second path.

6. The method of claim 1, wherein the first primitive and the second primitive include a line, an arc, or a clothoid.

7. The method of claim 1, wherein generating the connection path further comprises optimizing parameter values of the first primitive and the second primitive by modeling a non-linear optimization function to achieve a threshold smoothness level.

8. The method of claim 1, wherein the first primitive replaces the end section of the first path and the second primitive replaces the corresponding end section of the second path.

9. The method of claim 1, further comprising adjusting connection points of the Bezier curve to reduce a connection angle between the Bezier curve and the first path and reducing the connection angle between the Bezier curve and the second path.

10. A system comprising:
a memory component; and
a processing device coupled to the memory component, the processing device to perform operations comprising:
receiving a first path and a second path displayed in a user interface;
identifying a first primitive corresponding to a curvature of an end section of the first path based on sampled points of the first path;
identifying a second primitive corresponding to a curvature of an end section of the second path based on sampled points of the second path;
replacing a portion of the first path and a portion of the second path with a Bezier curve by converting the first primitive and the second primitive into the Bezier curve; and
generating a connection path for display relative to the first path and the second path in the user interface based on the Bezier curve, the connection path connecting the first path to the second path.

11. The system of claim 10, wherein the sampled points of the first path and the sampled points of the second path are identified by determining an end section of the first path and a corresponding end section of the second path.

12. The system of claim 11, wherein determining the end section of the first path and the corresponding end section of the second path includes identifying a shortest Euclidean distance between two endpoints of the first path and the second path.

13. The system of claim 10, wherein the first primitive and the second primitive include a line, an arc, or a clothoid.

14. The system of claim 10, wherein generating the connection path further comprises optimizing parameter values of the first primitive and the second primitive by modeling a non-linear optimization function.

15. The system of claim 10, wherein the Bezier curve is formed by joining different Bezier curves.

16. The system of claim 10, further comprising adjusting connection points of the Bezier curve to reduce a connection angle between the Bezier curve and the first path and reducing the connection angle between the Bezier curve and the second path.

17. A non-transitory computer-readable storage medium storing executable instructions, which when executed by a processing device, cause the processing device to perform operations comprising:
receiving a first path and a second path displayed in a user interface;
determining an end section of the first path and a corresponding end section of the second path;
identifying a first primitive based on a curvature of the end section of the first path and a second primitive based on a curvature of the corresponding end section of the second path; and
generating a connection path for display relative to the first path and the second path in the user interface by converting the first primitive and the second primitive into a Bezier curve that is a continuous path, the Bezier curve replacing the end section of the first path and the end section of the second path and connecting the first path to the second path.

18. The non-transitory computer-readable storage medium of claim 17, wherein the first primitive is identified by sampling points of the end section of the first path and the second primitive is identified by sampling points of the corresponding end section of the second path.

19. The non-transitory computer-readable storage medium of claim 17, wherein the first primitive and the second primitive include a line, an arc, or a clothoid.

20. The non-transitory computer-readable storage medium of claim 17, wherein generating the connection path further comprises replacing the end section of the first path and the corresponding end section of the second path with the Bezier curve.

* * * * *